Dec. 3, 1963 H. ARNOTT 3,112,733
PET DRINKING FOUNTAIN
Filed March 22, 1962
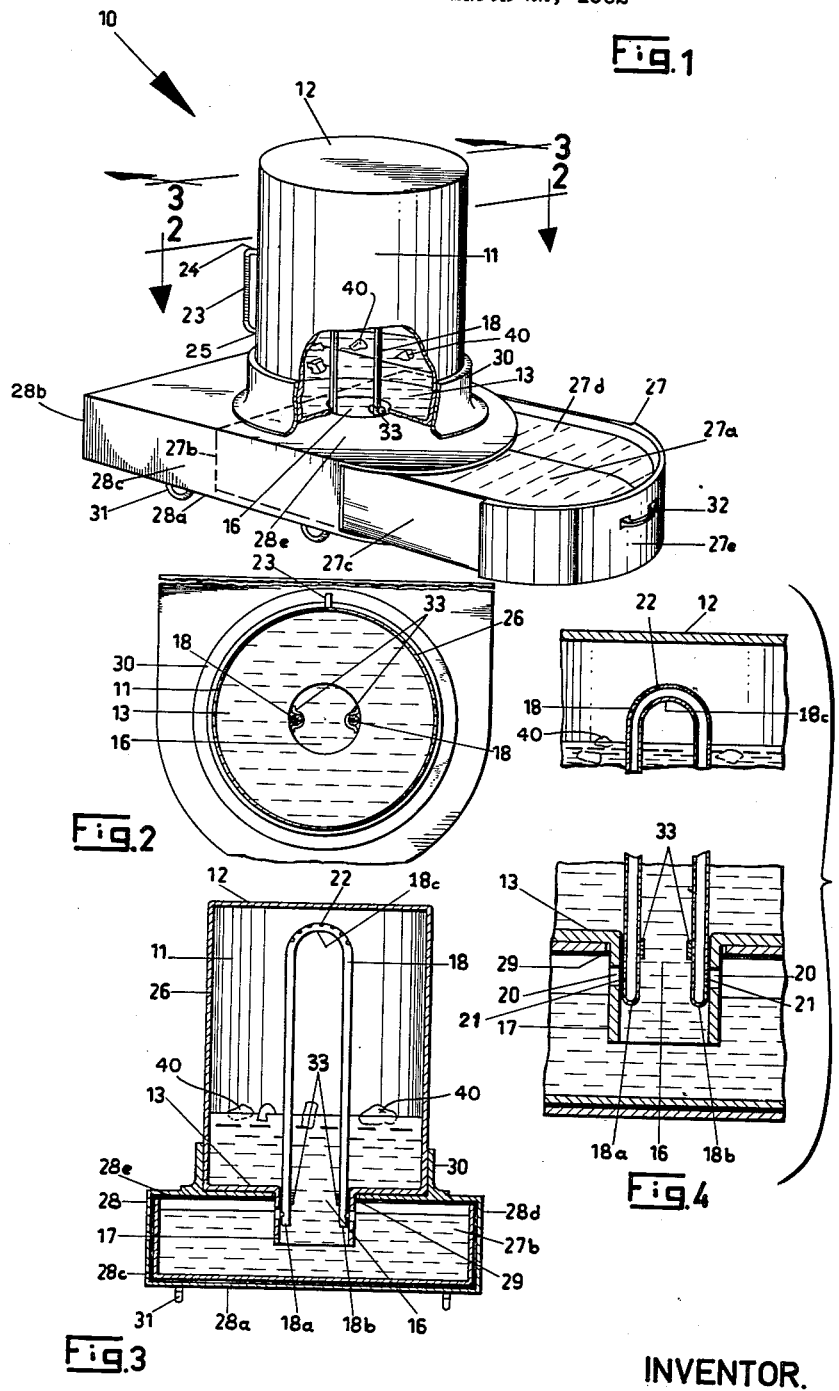
INVENTOR.
Hugh Arnott

United States Patent Office 3,112,733
Patented Dec. 3, 1963

3,112,733
PET DRINKING FOUNTAIN
Hugh Arnott, Willowdale, Ontario, Canada (% Canadian Research & Development Foundation, 1434 Queen St. W., Toronto 3, Ontario, Canada)
Filed Mar. 22, 1962, Ser. No. 181,648
4 Claims. (Cl. 119—77)

This invention relates to a drinking fountain for use by animals and, more particularly to a drinking fountain for use by domestic pets such as dogs, cats, birds or the like.

It is conventional practice for the owners of domestic pets to provide drinking water for their animals by the simple expediency of a shallow bowl or dish filled from a water faucet and placed in a convenient location on the floor. Although this system satisfies the immediate basic requirements, it is not a satisfactory one and has many disadvantages, such as, for instance in the event of the owner having to leave his pet unsupervised for a period of time, the amount of water contained by a conventional water dish might well be inadequate, particularly in hot weather when the frequent need to drink, combined with the reductions by evaporation, quickly empties a water dish. Furthermore, water left in an open dish soon becomes warm and brackish in hot weather, particularly in an outdoors location, while during winter, freezing of the water occurs.

An examination of the prior art in the field of water supply to animals provides evidence of numerous devices adapted to supply fresh water to stock raised for commercial purposes, the provision of water to poultry, cattle, sheep and hogs having been given considerable attention. Since my assembly is intended primarily as a domestic pet drinking fountain, and as the systems in current application are unsuitable for domestic animals, I wish, therefore, to provide a pet drinking fountain, referred to hereinafter as a pet fountain, which has a prime object, the provision of a constant supply of fresh, hygienic water for such domestic animals as dogs, cats and the like.

It is another object of this invention to provide a pet fountain which will contain and dispense a supply of water sufficient to last for a period of days without refilling.

It is a further object of this invention to provide a pet fountain which will maintain a constant and convenient water level irrespective of the reductions caused by drinking or evaporation.

It is still another object of this invention to provide a pet fountain, the drinking trough of which may quickly and easily be removed for cleaning.

It is yet another object of this invention to provide a pet fountain which is easy to transport and occupies a minimum of space when in use.

It is yet a further object of this invention to provide a pet fountain wherein the water is kept at a reasonable drinking temperature irrespective of ambient temperature.

It is still a further object of this invention to provide a pet fountain which is relatively inexpensive to produce, efficient in operation and capable of construction in a wide range of sizes depending upon requirements.

These and other objects and features of this invention will become apparent when taken in conjunction with the accompanying drawings in which:

FIG. 1 is a part cut-away perspective view of a pet drinking fountain embodying the present invention shown with the drinking trough in its extended position.

FIG. 2 is a partial sectional, plan view of the device illustrated in FIG. 1, taken on the line 2—2.

FIG. 3 is a sectional, side elevation of the assembly illustrated in FIG. 1, taken on the line 3—3.

FIG. 4 is an enlarged, fractional view of the apparatus illustrated in FIG. 3, showing particularly the air balance device.

Referring to FIGS. 1, 2 and 3, a pet fountain 10 consists of a water storage cylinder 11 having a top 12 and a base 13. Bottom 13 of cylinder 11 has an opening 16 situated centrally therein and is defined by a downwardly projecting flange 17. A tube 18, which may be formed from a suitable plastic material, has an inverted U-configuration terminating in ends 18a and 18b, both of which are sealed. Tube 18 is located substantially centrally and vertically within cylinder 11 and has its ends 18a and 18b rigidly affixed by semi-circular brackets 33 located in diametrically opposed relationship on the inner peripheral face of flange 17. Two air inlet orifices 20 formed through flange 17 are adjacent to and in axial alignment with two tube inlets 21 of tube 18. Inlet orifices 20 have a greater diameter than tube inlets 21 thus allowing for any slight misalignment of orifices 20 and tube inlets 21 during assembly. A plurality of air outlets 22 are located through the outer wall of U-bend 18c of tube 18, thereby permitting air to enter cylinder 11 through orifices 20, inlets 21, tube 18 and outlets 22 upon said orifices 20 and inlets 21 being exposed. A conventional water gauge 23 may be located in any suitable position on cylinder 11, ends 24 and 25 of water gauge 23 passing through cylinder wall 26 of cylinder 11, and being attached therein by conventional nut and thread means.

Referring to FIGS. 1 and 3, a water trough 27 consists of a base unit 27a, a rear end wall 27b, two oppositely located side walls 27c and 27d and a substantially semi-circular front end wall 27e. Water trough 27 is slidably housed within an outer container 28. Outer container 28 has a substantially similar configuration, consisting of a base unit 28a, and end wall 28b, two oppositely located side walls 28c and 28d and a top cover 28e. Base unit 28a and top cover 28e of outer container 28 are suitably contoured to effect an edge to edge relationship with semi-circular front end wall 27e of trough 27 when trough 27 is in the closed position.

A circular orifice 29 is formed subtantially centrally within top cover 28e of outer container 28 and is adapted to slidably receive flange 17 of bottom 13 of cylinder 11. A vertical flange 30, integral with top cover 28e of outer container 28 and extending upwardly therefrom is coaxial with flange 17 and is adapted to receive and stabilize cylinder 11 when pet fountain 10 is assembled.

Outer container 28 is supported by a plurality of U-shaped feet 31 situated on the underside of base unit 28a and adapted to allow a clearance between pet fountain 10 and the floor or the like.

A handle 32 of the conventional draw type is affixed by thread and nut means to semi-circular front end wall 27e of water trough 27 to facilitate easy extension and retraction of water trough 27 without outer container 28.

In order to fill fountain 10 with water cylinder 11 is disengaged from outer container 28 and water trough 27, and inverted either directly beneath a water faucet or in close proximity thereto. Water is fed direct from the faucet, or via a supply hose into bottom opening 16 of base 13. (The amount of water stored in cylinder 11 will depend upon requirements, but a minimum supply of three or four days water is envisaged for convenience.)

Upon cylinder 11 being substantially filled with water, outer container 28 with water trough 27 in the fully closed position, and empty, is inverted and slidably located upon cylinder 11, flange 17 of base 13 passing through circular orifice 29 of top cover 28e. Flange 30 of top cover 28e slidably receives cylinder 11. The complete assembly of pet fountain 10 is again inverted to bring cylinder 11 into its normal position of rest upon container 28 and positioned in a suitable location with water trough 27 extended. (It should be noted that the end wall 27b of water trough 27 will bear against flange 17 of base 13 of cylinder 11 and thus be prevented from being pulled completely out of outer container 28.) Upon pet fountain 10 being mounted in the operating position as described, water passes through bottom opening 16 of base 13 and into water trough 27 which rapidly fills until the water level seals off air inlet orifices 20 in flange 17 this terminating the supply of air to the interior of cylinder 11. The water will, therefore, be maintained at an optimum level within water trough 27 for convenient drinking, any reductions caused by the pet drinking or by evaporation allowing the level to fall sufficient to permit more air to enter cylinder 11 via tube 18 and inlet orifices 20 thereby displacing a compensating volume of water from cylinder 11. Upon inlet orifices 20 being sealed again by the elevated water level, no further water will pass into water trough 27. In this manner, a constant water level is maintained within water trough 27 until cylinder 11 requires refilling.

Ice cubes 40 may be introduced to the water in cylinder 11 during the filling operation to keep the water in a cool and fresh condition. Water gauge 23 will keep the user informed of the quantity of water within pet fountain 10 and will give a visible indication as to the level of the water within cylinder 11.

An additional feature to my invention of a pet drinking fountain is a winterized version of the trough 27 wherein it may be equipped with a double bottom housing therein a heater element and thermostatic switch. This serves both to maintain the water at a reasonably drinkable temperature and also to prevent the unit from freezing up. Metal covered electrical conduit should, of course, be utilized in this installation, both for safety reasons and to prevent animals from chewing through to the wiring.

While I intend my invention of a pet drinking fountain to be applied primarily to domestic animals, the description herein is not intended to limit the assembly to the specific applications discussed, and therefore, the general design of the individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

1. A pet drinking fountain comprising an outer container including a base unit for resting on a support surface, said outer container including upstanding end and side walls, and a top cover defining an end opening in said outer container, said top cover including a vertical flange surrounding a transverse opening; an upwardly-opening water trough reciprocally received in said outer container and including a base integral with upstanding rear, side and end walls terminating below said outer container top cover, and a water storage member having a cross-section substantially corresponding to the area defined by said vertical flange of said outer container top cover for removable receipt therein, said water storage member including a transverse base engageable on the upper surface of said top cover, and said water storage member base including a portion forming an opening therein and a downwardly projecting flange extending through said top cover opening and projecting into said upwardly-opening water trough and disposed in the reciprocable path of said trough to prevent withdrawal thereof from said outer container.

2. The structure of claim 1 in which said water storage member includes a closed top, and automatic air-introducing means on said water storage member for introducing air therein in relation to the level of water in said upwardly opening trough.

3. The structure of claim 2 in which said air introducing means comprises at least one laterally-disposed, air inlet orifice intermediately of said water storage member dowardly projecting flange and vertically extending tube means secured on said water storage member flange, said tube means including at least one leg, a lower sealed end and a lateral air-inlet in alignment with said air inlet orifice, said tube means including an air outlet portion adjacent the top of said water storage member.

4. The structure of claim 2 in which said air introducing means comprises a pair of opposed, lateral air inlet orifices intermediately of said water storage member, downwardly extending flange, and a tube having an inverted U-shaped configuration secured to said downwardly extending flange, said tube having portions overlying said air inlet orifices and being terminally sealed therebeneath, said tube having lateral air inlet openings in alignment with said air inlet orifices, said tube including upper air outlet openings for communicating air into said water storage member.

References Cited in the file of this patent

UNITED STATES PATENTS

| 901,048 | Talley | Oct. 13, 1908 |
| 945,706 | Crum | Jan. 4, 1910 |
| 2,623,500 | Riley et al. | Dec. 30, 1952 |
| 2,664,494 | Beekley | Dec. 29, 1953 |
| 2,791,984 | Franklin | May 14, 1957 |

FOREIGN PATENTS

| 762,933 | France | Jan. 29, 1934 |
| 948,570 | Germany | Sept. 6, 1956 |